United States Patent [19]

Abe et al.

[11] 4,297,248

[45] Oct. 27, 1981

[54] METHOD FOR PACKING CATALYSTS

[75] Inventors: Kazunobu Abe, Izumi; Tadao Nakatsuji, Matsubara; Toshikatsu Umaba, Sakai, all of Japan

[73] Assignee: Sakai Chemical Industry Co., Ltd., Japan

[21] Appl. No.: 167,099

[22] Filed: Jul. 8, 1980

Related U.S. Application Data

[63] Continuation of Ser. No. 27,440, Apr. 5, 1979, abandoned.

[30] Foreign Application Priority Data

Apr. 15, 1978 [JP] Japan ................................. 53-40738

[51] Int. Cl.$^3$ ............................................. B01J 35/04
[52] U.S. Cl. ............................................... 252/477 R
[58] Field of Search ................... 252/477 R; 422/171, 422/180, 191, 222

[56] References Cited

U.S. PATENT DOCUMENTS

| | | | |
|---|---|---|---|
| 3,785,781 | 1/1974 | Hervert et al. | 422/171 |
| 3,860,535 | 1/1975 | Johnson | 252/477 R |
| 4,025,462 | 5/1977 | Cleveland | 252/477 R |
| 4,028,275 | 6/1977 | Sakai et al. | 252/477 R |
| 4,118,199 | 10/1978 | Völker et al. | 252/477 R |
| 4,127,691 | 11/1978 | Frost | 252/477 R |

*Primary Examiner*—W. J. Shine
*Attorney, Agent, or Firm*—Jones, Tullar & Cooper

[57] ABSTRACT

A method for packing catalysts comprising packing the catalysts having through-holes in the direction of the flow of the gas with plurality of them being arranged in the direction of the flow of the gas through the catalyst-packed layers, characterized by arranging the catalysts in such manner that the sections of the connecting parts in the direction of the flow of the gas do not lie on the same plane as at least one of the above sections of the connecting parts formed by the adjacent catalysts.

3 Claims, 6 Drawing Figures

METHOD FOR PACKING CATALYSTS

This is a continuation of application Ser. No. 27,440, filed Apr. 5, 1979, now abandoned.

DESCRIPTION OF THE INVENTION

The present invention relates to a method for packing catalysts having through-holes in the direction of the flow of a gas (hereinafter referred to as "honeycomb catalyst(s)") into a basket.

The honeycomb catalysts show extremely small pressure drop by gas flow and are usable under a high linear velocity. Particularly, they are suitable for treating an exhaust gas containing dust, because the dust can be let through the through-holes without being accumulated on the catalyst bed.

On the other hand, the honeycomb catalysts are usually produced by the extrusion-molding method, and their appearances and sizes are limited to a certain degree. Due to this reason, the honeycomb catalysts are frequently arranged in a basket, and the basket is used for packing a reactor.

When, however, the honeycomb catalysts are arranged at random according to a conventional method, there are produced deviations in the vertical and horizontal directions of the cross-section perpendicular to the direction of the gas flow due to the size differences unavoidably involved in the honeycomb catalysts, which are attributed to their production. For instance, FIGS. 1, 2 and 3 of the accompanying drawings shown respectively a perspective view, a plane view and a front view of an embodiment of the at random arrangement of 18 honeycomb catalysts ($2 \times 3 \times 3$) in a basket, each honeycomb catalyst being in a rectangular parrallelepiped of which the inner space is divided into four through-holes having a nearly equal section area, according to a conventional method. In these Figures, the diviations are supplemented with a packing material such as silica-alumina ceramic fibers. With the increase of the number of the honeycomb catalysts to be arranged, the deviations become larger so that the through-holes in the direction of the gas flow are dislocated one another, and the pressure drop and the blockade of the through-holes by dust are caused.

The present invention provides a method for packing a basket with honeycomb catalysts, which overcomes the drawbacks as seen in the conventional at random packing method.

According to the method of this invention, honeycomb catalysts are arranged in such a manner that the section of the connecting part of a honeycomb catalyst to another honeycomb catalyst arranged in the gas flow direction does not lie on the same plane as that of the connecting part between the honeycomb catalysts adjacent to them in any direction (i.e. in the vertical and horizontal directions), i.e. in the so-called "zig-zag" manner, whereby the production of deviation is substantially avoided even when a number of the honeycomb catalysts having size differences are arranged in a basket, and therefore any pressure drop and blockade of through-holes by dust are not caused.

By packing the honeycomb catalysts in such a manner that the sections of the connecting parts in the direction of the flow of the gas do not lie on the same plane as that of at least one of the above sections of the connecting parts formed by the adjacent catalysts, i.e. by packing the honeycomb catalysts in zig-zag arrangements and thus stabilizing the honeycomb catalysts in a space, it has now become possible to realize the effects as described above. It is more desirable that, in packing the catalysts, the fillers such as silica-alumina ceramic fibers, asbestos, fire-resisting mortar, etc. are filled between the lateral sides of the adjacent catalysts and between the lateral side of the catalyst and the lateral side of the basket.

The present invention is hereafter explained in further detail.

Figure 2:
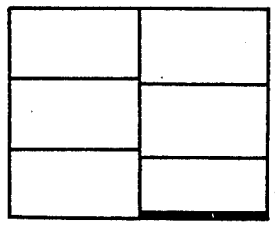
Figure 4:
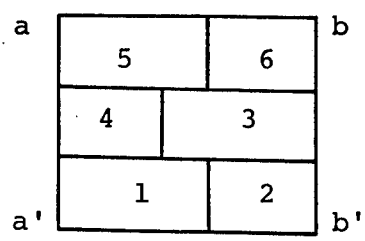
FIG. 4 represents a plane view of honeycomb catalyst units packed in zig-zag form in the direction of gas flow.

FIG. 4 shows that a pair of long and short honeycomb catalysts are packed in the basket in such manner that the long honeycomb catalysts on a—a' side and the short honeycomb catalysts on b—b' side laid on the odd number steps, and the short honeycomb catalysts on a—a' side and the long honeycomb catalysts on b—b' side laid on the even number steps, respectively. As apparent from FIG. 4, the honeycomb catalysts are packed in zig-zag forms in the direction of the flow of gas, so that, for example, the honeycomb catalyst 3 is prevented from deviating in the perpendicular direction by means of the honeycomb catalysts 1 and 2, and the honeycomb catalyst 5 is prevented from deviating in the perpendicular direction by the honeycomb catalysts 3 and 4. However, according to the above zig-zag packing method, the deviation in the perpendicular direction may be prevented but there may occur cases where the deviation in the horizontal direction cannot be prevented, as shown in FIG. 2.

Figure 1:
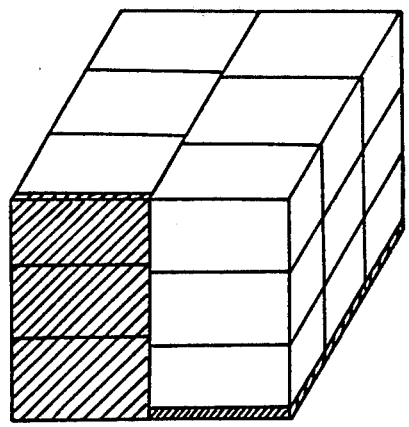
FIGS. 1, 2, and 3, respectively, show a perspective view, a plane view, and a front view of a conventional random catalyst unit arrangement.
Figure 5:
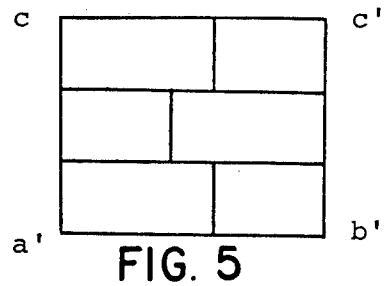
FIG. 5 represents a plane view.
Figure 6:
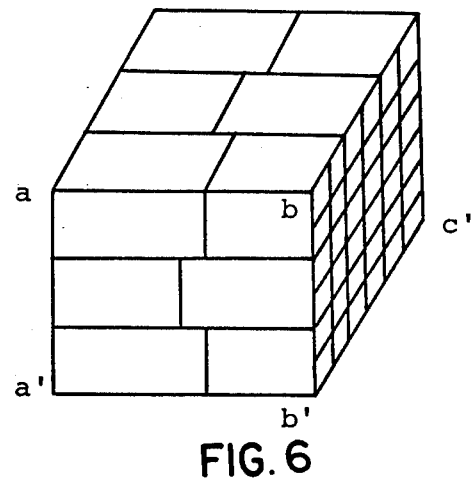
FIG. 6 represents a perspective view of a honeycomb catalyst units placed in a zig-zag form in both horizontal and vertical directions.
Figure 3:
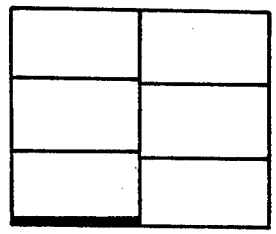

FIG. 5 is a plane view of a basket packed with a pair of long and short honeycomb catalysts in one step. It shows that on the odd number row from a'—b' there are packed the long honeycomb catalysts on a'-c side and the short honeycomb catalysts on the c'-b' side, and on the even number row the arrangements are in the reverse order thereto. In this case, in the second step of the basket the long and the short honeycombs are packed in the reverse order to that of the first step, and thereafter on the odd number step the packing is made in the same manner as in the first step and on the even number step in the same manner as in the second step, respectively. When the packing is effected in this manner, the honeycomb catalysts are packed in zig-zag form in both the perpendicular and the horizontal directions of the basket, they are prevented from causing deviations in perpendicular (vertical) and horizontal directions, there is no deviation of gas flow through holes at the connecting part of the honeycomb catalysts so that the increase of pressure loss and the blockade by dust can be fully prevented. A perspective view of the basket packed with the catalysts by this method is shown in FIG. 6.

DETAILED DESCRIPTION OF THE INVENTION

Thus, as can be seen from the above, the invention can be described as a method of horizontally or vertically packing a plurality of individual honeycomb catalyst units having through holes in the direction of an intended gas flow to form a composite catalyst structure having a plurality of through holes in the direction of an intended gas flow through holes in the direction of an intended gas flow through the structure, which method comprises arranging the individual catalyst units in a manner such that the interface in the path of intended gas flow between two such catalyst units does not lie on the same plane as the interface in the path of intended gas flow between at least one vertically or horizontally adjacent pair of said catalyst units. Preferably, said interface between said two units does not lie on the same plane as said interface between any pair of catalyst units vertically or horizontally adjacent said two units.

What is claimed is:

1. A method of horizontally and vertically packaging a plurality of individual honeycomb catalyst units having through holes in the direction of an intended gas flow to form a composite catalyst structure having a plurality of through holes in the direction of an intended gas flow through the structure, which method comprises arranging the individual catalyst units in a manner such that the interface in the path of intended gas flow between two such catalyst units does not lie on the same plane as the interface in the path of intended gas flow between at least one vertically or horizontally adjacent pair of said catalyst units.

2. A method as in claim 1 wherein said interface between said two catalyst units does not lie on the same plane as the said interfaces between any vertically or horizontally adjacent pair of said catalyst units.

3. A method as in claims 1 or 2 wherein the catalyst units are rectangular in shape.

* * * * *